(12) United States Patent  
Cheng

(10) Patent No.: US 9,032,591 B2
(45) Date of Patent: May 19, 2015

(54) CABLE TIE

(71) Applicant: Taiwan Paiho Limited, Ho Mei Town, Chang Hua Hsien (TW)

(72) Inventor: Allen Cheng, Chang Hua Hsien (TW)

(73) Assignee: TAIWAN PAIHO LIMITED, Ho Mei Town, Chang Hua Hsien (TW)

( * ) Notice: Subject to any disclaimer, the term of this patent is extended or adjusted under 35 U.S.C. 154(b) by 204 days.

(21) Appl. No.: 13/683,962

(22) Filed: Nov. 21, 2012

(65) Prior Publication Data

US 2014/0068896 A1    Mar. 13, 2014

(30) Foreign Application Priority Data

Sep. 11, 2012   (TW) .............................. 101217484 U

(51) Int. Cl.
*F16L 3/233* (2006.01)
*B65D 63/10* (2006.01)

(52) U.S. Cl.
CPC ......... *B65D 63/1063* (2013.01); *Y10T 24/1498* (2013.01); *F16L 3/233* (2013.01); *B65D 63/1027* (2013.01)

(58) Field of Classification Search
CPC ........... B65D 63/1027; B65D 63/1063; B65D 63/1072; B65D 3/1081; B65D 63/1036; B65D 63/1045; B65D 63/1054; F16L 3/233; F16L 3/2332; F16L 3/2334; F16L 3/2336; F16L 3/2338; F16L 3/24
USPC ................. 24/271, 272, 16 PB, 30.5 P, 17 AP
See application file for complete search history.

(56) References Cited

U.S. PATENT DOCUMENTS 4,537,432 A * 8/1985 Meeks .......................... 292/318

* cited by examiner

*Primary Examiner* — Jack W Lavinder
(74) *Attorney, Agent, or Firm* — Muncy, Geissler, Olds & Lowe, P.C.

(57) ABSTRACT

A cable tie including a stripe body having a first surface and a second surface opposite to the first surface. A plurality of convex portions are disposed on the first surface in a regularly arranged manner. A first end of the stripe body has a stationary portion, while a second end opposite to the first end has a movable portion. A pawl hole and a pawl are formed on the stationary portion, and the width of the pawl hole is greater than that of the movable portion. Each of the convex portions of the stripe body has a hook oriented toward the first end. Therefore, the hooks engage the pawl when the movable portion of the stripe body passes through the pawl hole for achieving a securing effect.

7 Claims, 5 Drawing Sheets

CABLE TIE

BACKGROUND OF THE INVENTION

1. Technical Field

The present invention relates to a cable tie and, in particular, to a cable tie formed with hook-like structures.

2. Description of the Prior Art

Cable ties are used widely in daily life, and are frequently used for securing or binding objects. Due to the capability of easily being used, carried, stored, and high safety in operation, cable ties are strongly demanded by people.

Well-known cable ties can be classified into unreleasable cable ties and releasable cable ties. Both types of cable ties are operated on the same concept basis. That is a slot is formed at an end of the cable tie with a teeth-like structure to be engaged with teeth formed on a tape body of the same cable tie so as to tightly secure the object to be bound for the convenience of tidying.

A common releasable cable tie is referred to one having the capability of allowing the teeth on the tape body engaged with the teeth-like structure in the slot to be successfully released. A releasable cable tie is therefore can be reused. Frequently, a releasable cable tie is used in simple tidying of an object such as power cords to be bound.

On the other hand, an unreleasable cable tie is the one that does not allow the teeth of the tape body engaged with the teeth-like structure in the slot to be released. In the unreleasable cable tie case, once the tape body of the cable tie is inserted into the slot for engagement, the only thing to do with the cable tie is to pull the tape body to make the resulted close loop become tighter, and the cable tie is not able to be disabled without cutting or damaging. Thus, an unreleasable cable tie is for single use only.

In response to the large market demand for cable ties, cable ties should be designed to be much simple for convenience of mass production in addition to having good securing performance, easiness of storage, and convenience of use. Currently, it is unavoidable that a cable tie would have an excess portion after the resulted close loop being pulled tight for securing an object to be secured. Such an excess portion is usually unable to be neatly positioned and affects the fineness of the cable tie, and therefore causes inconvenience when securing objects. This excess portion though can be cut off; however, a requirement for a pair of scissors or other tools significantly reduces users' convenience of operating the cable tie.

Moreover, inconvenience also comes from some cable ties designed to have a complicated structure in accompany with other parts that would be assembled in usage of the cable ties. In addition, the high manufacturing cost of these cable ties is always a critical question for the manufacturer.

In view of this, diminishing the operational inconvenience for cable tie users while maintaining the complete securing effect of the cable tie and further improving the neatness thereof after use are desired for the cable tie manufacturers.

SUMMARY OF THE INVENTION

In order to solve the problems exist in the currently-available cable ties, the present invention provides a cable tie including a stripe body having a first surface and a second surface opposite to the first surface. A plurality of convex portions are disposed on the first surface in a regularly arranged manner. A first end of the stripe body has a stationary portion, while a second end opposite to the first end has a movable portion. A pawl hole and a pawl are formed on the stationary portion, and the width of the pawl hole is greater than that of the movable portion. Each of the convex portions of the stripe body has a hook-like structure, and tips of the hook-like structures are oriented toward a fixed direction. Therefore, at least one of the hook-like structure engage the pawl when the movable portion of the stripe body passes through the pawl hole for achieving a securing effect.

The main objective of the present invention is to provide a cable tie comprising a stripe body, wherein convex portions of the stripe body have hook-like structures, and tips of the hook-like structures are oriented toward a fixed direction. Therefore, the hook-like structures can engage the pawl after the stripe body has passed through the pawl hole, and enable the cable tie to tightly bind an object to be bound with a single structure.

Another objective of the present invention is to provide a cable tie comprising a stripe body, wherein convex portions of the stripe body have hook-like structures, and tips of the hook-like structures are oriented toward a fixed direction. A first surface of the stripe body can be bent backwards. In addition, the respective convex portions disposed on the first surface comprise hook-like structures which can engage mutually. Accordingly, a user may bend a portion of the cable tie exceeding a pawl hole backwards to stack and engage the other portion of this cable tie, which does not pass through the pawl hole, for tidying such excess portion. As a result, the safety and neatness of the cable tie during operation can be improved.

Still another objective of the present invention is to provide a thermo-pressed cable tie, which can be mass-produced for lowering the manufacturing cost thereof.

The cable ties proposed in the present invention is advantageous over conventional cable ties in that, the cable ties proposed in the present invention can achieve a effect of completely tightly binding an object, improve the storing convenience and neatness of the bound object. The user may cut off the portion of the cable tie exceeding the pawl hole, or bend such excess portion backward to make it stack and engage the other portion of this cable tie, which does not pass through the pawl hole, for tidying such excess portion. As a result, the safety and neatness of the cable tie during operation can be improved. In addition, fabricating the cable tie of the present invention by thermo pressing can lower the manufacturing cost thereof.

DETAILED DESCRIPTION OF THE PREFERRED EMBODIMENTS

In order to enable those skilled in the art to further understand the object, technical features and advantages of the present invention, and to implement the present invention, the technical features and implementing method are illustrated in the following description and further demonstrated with preferred embodiments. However, the following description for the embodiments is not for limiting the present invention. Also, the drawings referred in the following text are schematically related to the features of the present invention.

Figure 1:
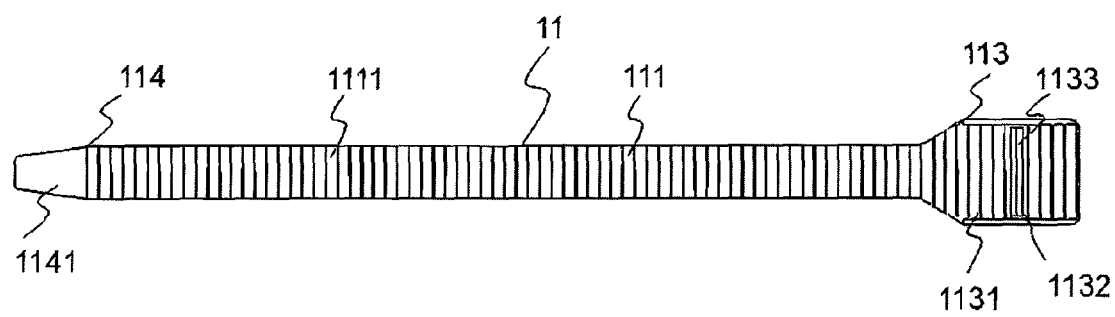
FIG. 1 is a schematic top view of a cable tie proposed in an embodiment of the present invention.
Figure 2:
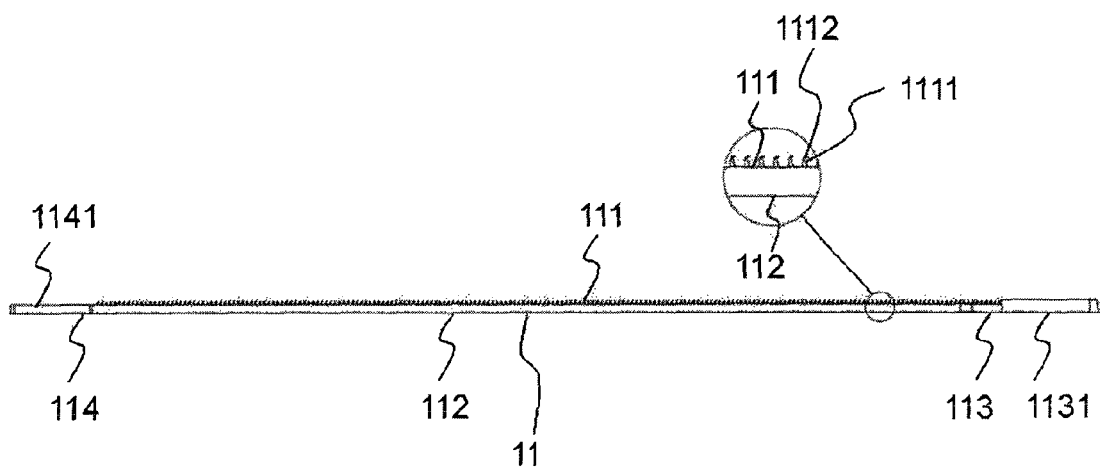
FIG. 2 is a schematic side view of the cable tie proposed in the same embodiment of the present invention.

First, please refer to FIG. 1 and FIG. 2, which are top view and side view of a cable tie proposed in an embodiment of the present invention, respectively. As shown in FIG. 1, the cable tie 1 comprises a stripe body 11 having a first surface 111, such as the upper surface, and a second surface 112, such as the lower surface. Regularly arranged multiple convex portions 1111 are provided on the first surface 111. The width and height of these convex portions 1111 can be modified as required, and between respective convex portions 1111 may be a predetermined distance which can be modified depending on actual design requirements. A first end 113 of the stripe body 11 has a stationary portion 1131, and a second end 114 opposite to the first end 113 has a movable portion 1141. A pawl hole 1132 and a pawl 1133 located in the pawl hole 1132 are formed in the stationary portion 1131, and the width of the pawl hole 1132, measured along the direction being vertical to the direction along which the stripe body 11 extends, is larger than or equal to that of the movable portion 1141. When designing, the width of the movable portion 1141 changes with the width of the pawl hole 1132, but the width of the pawl hole 1132 shall not be larger than that of the stationary portion 1131. In addition, although the width of the stationary portion 1131 of this embodiment is shown to be larger than the width of the stripe body 11, the stationary portion 1131 and the stripe body 11 can be of the same width in another embodiment.

Next, still refer to FIG. 2, which is the side view of the cable tie 1 proposed in the same embodiment of the present invention. As shown in FIG. 2, each of the multiple convex portions 1111 of the stripe body 11 of the cable tie 1 has, on its end, a hook-like structure 1112, and the tip of each hook-like structure 1112 is oriented toward a fixed direction. Such fixed direction is set based on the effect of binding an object by the cable tie 1, so that the cable tie 1 with these hook-like structures 1112 can easily pass toward through the pawl hole 1132 but cannot reversely exit backward. As such, after the movable portion 1141 of the stripe body 11 of the cable tie 1 passes through the pawl hole 1132, the hook-like structures 1112 engages the pawl 1133 in the pawl hole 1132 for establishing fixation and achieving an one-time effect of tightly securing an object to be bound. Although the material of the cable tie 1 of the present invention is flexible plastic, the present invention does not limit the material of the cable tie 1. In addition, the stripe body 11, stationary portion 1131 and movable portion 1141 of the cable tie 1 of the present invention are integrally formed, i.e., the convex portions 1111 on the first surface 111 and the hook-like structures thereof are integrally formed when the stripe body 11 is formed.

Figure 3:
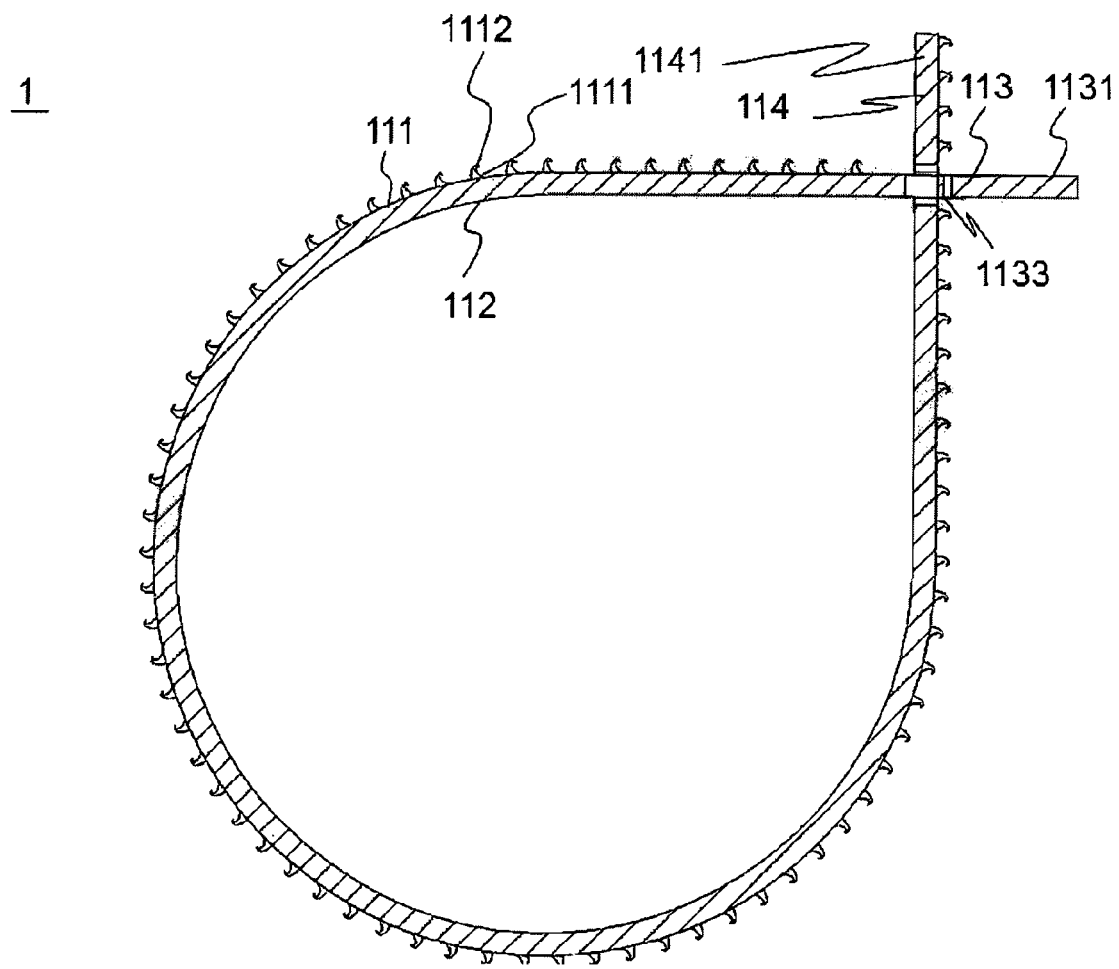
FIG. 3 is a schematic assembled view of the cable tie proposed in the same embodiment of the present invention.
Figure 4:
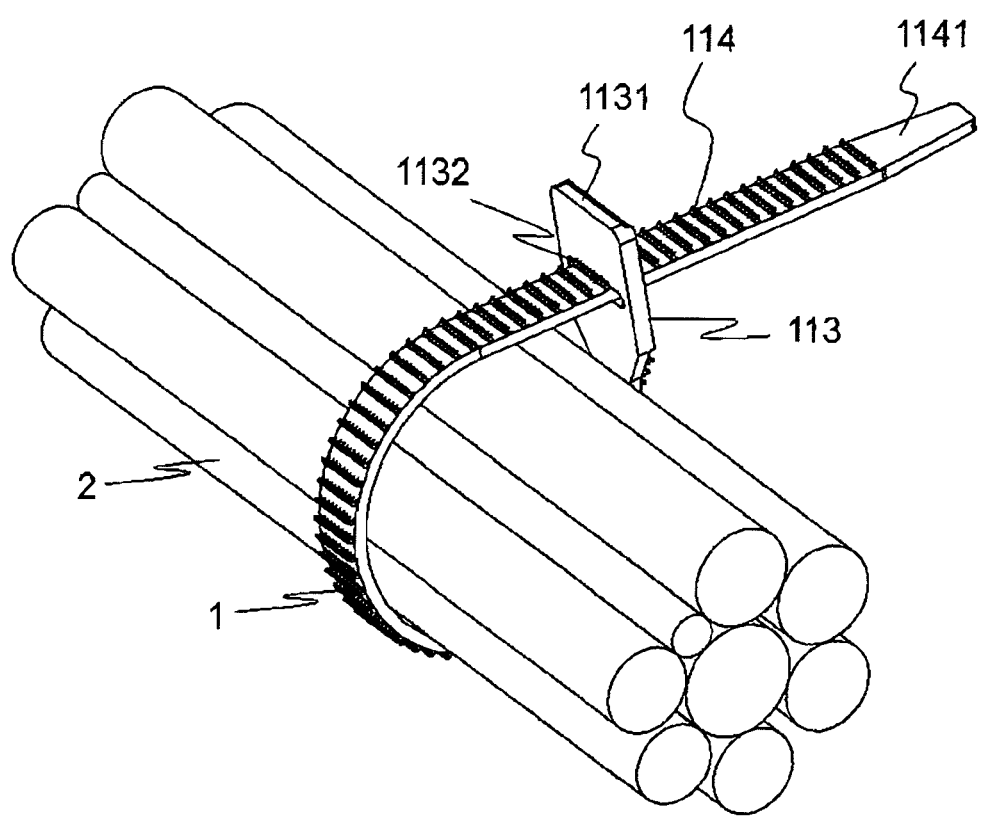
FIG. 4 is a perspective assembled view of the cable tie proposed in the same embodiment of the present invention and an object bound by the cable tie.

Please refer to FIG. 3 and FIG. 4, which are schematic views illustrating the assembly and binding of the cable tie 1 proposed in the same embodiment of the present invention. When using the cable tie 1 for binding an object, it is necessary to bend the cable tie 1 to enable the movable portion 1141 of the cable tie 1 to pass through the pawl hole 1132, and enable the first surface 111 to face outward. Here, the aforementioned direction toward which the tips of the hook-like structures 1112 of the cable tie 1 are oriented is a direction pointing toward the first end 113 of the cable tie 1. In other words, the tips of the hook-like structure 112 are oriented toward the first end 113. When the cable tie 1 with these hook-like structures 1112 passes through the pawl hole 1132 by means of the movable portion 1141, the hook-like structures 1112 are inserted into the pawl hole 1132 toward a direction which is opposite to the orientation of the tips of the hook-like structures 1112, i.e., the hook-like structures 1112 are inserted into the pawl hole 1132 in a manner of facing away from the pawl hole 1132. Furthermore, since the material of the cable tie 1 is flexible plastic, the pawl 1133 in the pawl hole 1132 and an edge of the pawl hole 1132 opposite to the pawl 1133 will compress the hook-like structures 1112, so that the hook-like structure 1112 can successfully pass through the pawl hole 1132. The hook-like structures 1112 that have passed through the pawl hole 1132 will resume their original state after the compression has been relived, and thus the tips of the hook-like structures 1112 face down toward the pawl hole 1132 and clasp the pawl 1133. As a result, the hook-like structures 1112 cannot reversely pass through the pawl hole 1132 again. Further, the user may cut off the portion of the cable tie 1 exceeding the pawl hole 1132 for achieving the effect of easily storing the object to be bound and improving neatness and safety.

The cable tie 1 proposed in this embodiment is made of flexible plastic by thermopressing, which is beneficial for simple mass production and manufacturing, and further reducing the fabricating cost of the cable tie 1. Also, the movable portion 1141 of the cable tie 1 is designed to have a smooth surface. With such smooth surface of the movable 1141 of the cable tie 1, the user may conveniently holds the movable portion 1141 of the cable tie 1 and easily makes it pass through the pawl hole 1132 when operating this cable tie 1, and therefore an improved operational convenience can be achieved.

Figure 5:
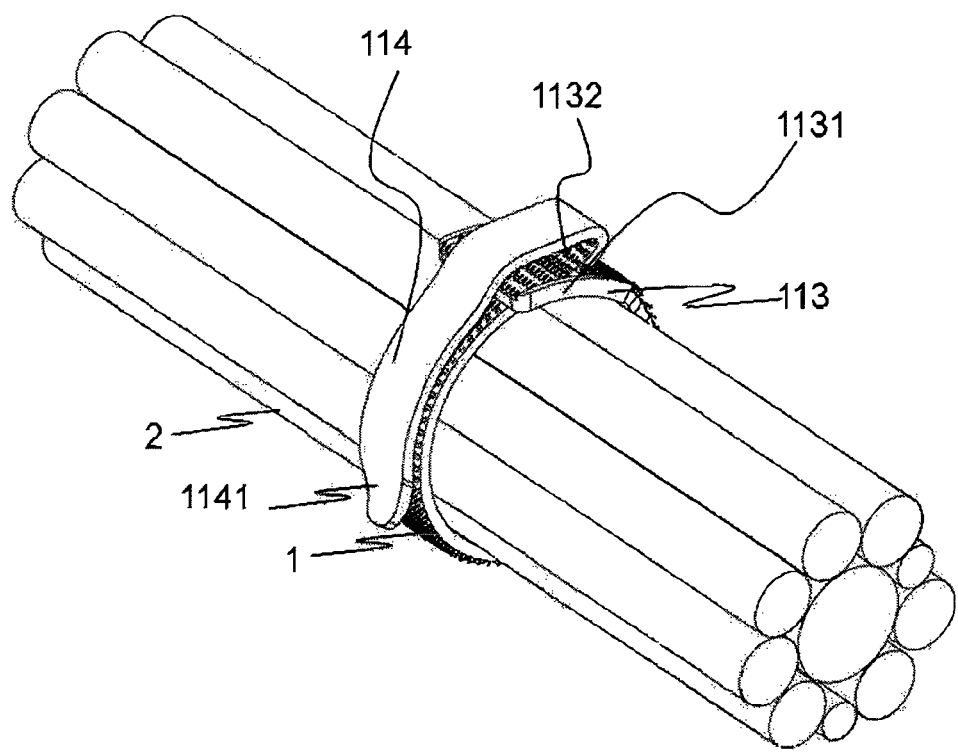
FIG. 5 is a schematic view of the retroflexed manner of the cable tie proposed in the same embodiment of the present invention.

Next, refer to FIG. 5, which is a schematic view of the retroflexed manner of the cable tie proposed in the same embodiment of the present invention after binding an object. As shown in FIG. 5, in addition to cutting off the excess portion of the cable tie 1 that is not used for binding as mentioned above, the first surface 111 of the stripe body 11 can be bended backwards such that the hook-like structures 1112 of the respective convex portions 1111 disposed on the first surface 111 can be made engaged with each other. That is to say, after the movable portion 1141 has passed through the pawl hole 1132, a portion of the stripe body 11 that has passed through the pawl hole 1132 is bent backwards and attached to the other portion of the stripe body 11 which do not pass through the pawl hole 1132, so that the hook-like structures 1112 of the convex portions 1111 on the first surface 111 in the portion of the stripe body 11 that has passed through the pawl hole 1132 and those in the portion of the stripe body 11 which do not pass through the pawl hole 1132 engage mutually. Therefore, after finishing the binding, the cable tie will have no excess portion that may obstruct activity space. As a result, the effect of easily storing the bound object and improving neatness and safety is achievable.

Those skilled in the art may practice the present invention in accordance with the aforementioned detailed description made in terms of several embodiments and the accompanying drawings. However, the embodiments of the present invention are for exemplifying but not limiting. In other words, without departing from the true spirit and scope of the present invention, alterations and modifications of the respective embodiments above are included in the present invention. The present invention is therefore defined with the appended claims below.

What is claimed is:

1. A cable tie comprising:
   a stripe body having a first surface and a second surface opposite to the first surface, a plurality of convex portions being disposed on the first surface in a regularly arranged manner, a first end of the stripe body having a stationary portion, a second end opposite to the first end having a movable portion, wherein a pawl hole and a pawl located in the pawl hole are formed on the stationary portion, wherein the convex portions are integrally formed with a plurality of hooks, each of the convex portions has on its end one of the hooks with a tip, being oriented toward the first end, and the hooks engage the pawl with the tips of the hooks clasping the pawl, when the movable portion passes through the pawl hole, wherein the convex portions on the first surface and the hooks are integrally formed on the stripe body; and wherein a part of the convex portions are inserted into the pawl hole toward a direction that is opposite to the orientation of the tips of the hooks when the movable portion passes through the pawl hole.

2. The cable tie of claim 1, wherein the cable tie is a thermo-pressed cable tie.

3. The cable tie of claim 1, wherein the material of the cable tie is flexible plastic.

4. The cable tie of claim 1, wherein the movable portion has a smooth surface.

5. The cable tie of claim 1, wherein the hooks of the convex portions on the first surface in a portion of the stripe body passing through the pawl hole and the hooks of the convex portions on the first surface in the other portion of the stripe body not passing through the pawl hole are mutually engaged.

6. The cable tie of claim 1, wherein the width of the pawl hole is greater than the width of the movable portion.

7. The cable tie of claim 1, wherein the width of the stationary portion is greater than the width of the stripe body.

* * * * *